United States Patent [19]
Busby et al.

[11] Patent Number: 5,649,693
[45] Date of Patent: Jul. 22, 1997

[54] POSITION SENSITIVE FRICTION DAMPER

[75] Inventors: James S. Busby, Costa Mesa; Stanley A. Needle, Irvine, both of Calif.

[73] Assignee: GT Bicycles, Inc., Santa Ana, Calif.

[21] Appl. No.: 519,567

[22] Filed: Aug. 25, 1995

[51] Int. Cl.⁶ .................. B60G 11/22; F16F 1/40
[52] U.S. Cl. .............. 267/294; 267/140.13; 267/141.1; 267/293
[58] Field of Search .................. 267/292, 293, 267/294, 141.1, 140.13, 140.4, 141; 280/284, 288; 180/227

[56] References Cited

U.S. PATENT DOCUMENTS

| | | |
|---|---|---|
| 439,095 | 10/1890 | Becker . |
| 578,615 | 3/1897 | Travis . |
| 606,323 | 6/1898 | Wronski . |
| 657,667 | 9/1900 | Mills . |
| 944,795 | 12/1909 | Leet et al. . |
| 1,047,430 | 12/1912 | Michaelson . |
| 1,257,761 | 2/1918 | Strand ..................... 280/284 |
| 1,298,958 | 4/1919 | Johnston ................. 280/284 |
| 1,412,012 | 4/1922 | Bruno . |
| 1,594,079 | 7/1926 | Tanner . |
| 2,486,741 | 11/1949 | Gabriel .................... 267/293 |
| 3,434,708 | 3/1969 | Hawk, Jr. .............. 267/294 X |
| 3,917,313 | 11/1975 | Smith et al. ............. 280/284 |
| 4,322,088 | 3/1982 | Miyakoshi et al. ..... 280/284 |
| 4,506,755 | 3/1985 | Tsuchida et al. ....... 180/227 |
| 4,529,056 | 7/1985 | Kreuz ....................... 180/227 |
| 4,673,053 | 6/1987 | Tanaka et al. .......... 180/227 |
| 4,789,174 | 12/1988 | Lawwill .................. 280/284 |
| 4,951,791 | 8/1990 | Belil Creixell ......... 180/219 |
| 4,997,197 | 3/1991 | Shultz ..................... 280/275 |
| 5,098,114 | 3/1992 | Jones ...................... 280/284 |
| 5,104,101 | 4/1992 | Anderson et al. .... 267/293 X |
| 5,121,937 | 6/1992 | Lawwill .................. 280/284 |
| 5,205,572 | 4/1993 | Buell et al. ............. 280/284 |
| 5,244,224 | 9/1993 | Busby ..................... 280/284 |
| 5,259,637 | 11/1993 | Busby ..................... 280/284 |

FOREIGN PATENT DOCUMENTS

| | | | |
|---|---|---|---|
| 3033294 | 4/1981 | Germany ................. 280/285 |
| 428442 | 12/1947 | Italy ........................ 280/285 |
| 220760 | 8/1924 | United Kingdom . | |

OTHER PUBLICATIONS

1992 Cannondale Spec—Suspension Mountain Bicycles—Article—10 pgs.
TREK 9000 Series Spec="This Beauty Is A Beast"—Article—8 pgs.
Fisher RS-1—Article—4 pgs.—Mountain Bike Action/ Mar. '92.
Suspension Mania Strikes Cycling—Mountain Bike Action/ Feb. '92 3 Pgs.

(List continued on next page.)

Primary Examiner—Peter M. Poon
Attorney, Agent, or Firm—Stetina Brunda & Buyan

[57] ABSTRACT

A bicycle shock absorber which is movable between compressed and uncompressed states, and comprises an elongate, resilient body defining top and bottom ends and a bore extending longitudinally therethrough. Disposed within the body is a position sensitive friction damper which itself comprises upper and lower support members disposed within respective ones of the top and bottom ends of the body. Disposed within the bore and attached to the upper support member is an elongate guide member which defines a slot extending longitudinally therewithin. Disposed within the slot is a dampening member which is slidably movable therewithin, with the slot being sized relative to the dampening member so as to provide frictional resistance to the movement thereof. Also disposed within the bore is an elongate connecting rod having a first end attached to the dampening member and a second end pivotally connected to the lower support member. The movement of the shock absorber between the compressed and uncompressed states facilitates the movement of the dampening member within the slot.

13 Claims, 3 Drawing Sheets

OTHER PUBLICATIONS

Boulder Intrepid AL—2 pgs.—Mountain Bike Action/Mar. '92.

Team Shockblok—6 pgs.—Mountain Bike Action/Jul. '92.

Mountain Bike Action, Oct. 1992, pp. 10, 25–26, 28–29, 31, 36–37, 39–41, 44–45, 47, 58, 70, 73, 76, 79, 123, and 130.

Bicycling, Nov. 1992, pp. 26–27, 58, 63–64, and 105.

Mountain Biking, Nov. 1992, vol. 6, No. 11, pp. 6–9, 25, 48–49, 65, 71, 73, 108–109, 115, 124, 129, 140, 143, 163, and 169.

Mountain Biking, Dec. '92, pp. 1–2, 5, 18, 44–49, 77, 127, and 160.

Mountain Biking, Jan. '93, vol. 7, No. 1, pp. 32–33, 40, 45, 71, 75, 82–83, 115, and 117.

Welcome to the Next Generation . . . —9 pgs.—Mountain Bike—Jun. '92.

Schwinn S.A.S.S.—7 pgs.—Mountain Bike Action—May '92.

Offroad Pro–Flex 550—3 pgs.—Offroad.

If the Best Motorcycle . . . "Litespeed Suspension", Mountain Bike—Jul. '9 8 pgs.

Slingshot—*Mountain & City Biking*, 6 pgs.

Guide to Suspension and High Performance, vol. 3, 1992, pp. 9, 13–15, 17, 30–31, 36–37, 42–45, 47, 53, 60, 69, 71, 76; 85–87, 92, 96, 98, 100, 108–112, 117, and 119.

POSITION SENSITIVE FRICTION DAMPER

FIELD OF THE INVENTION

The present invention relates generally to bicycle suspension systems, and more particularly to a bicycle shock absorber incorporating a position sensitive friction damper for regulating or dampening the rebound of the shock absorber.

BACKGROUND OF THE INVENTION

There is known in the prior art bicycle frames which include front and/or rear shock absorbing assemblies. Examples of bicycle frames which have a rear suspension system including a shock absorber are found in U.S. Pat. Nos. 5,409,249 and 5,441,292, both of which have been assigned to the named assignee of the present application.

In the prior art, two (2) types of shock absorbers are typically incorporated into the rear suspension system of the bicycle frame. The first type of shock absorber comprises a body portion and a reciprocally movable piston rod extending axially from the body portion which facilitates viscous damping control when working in a hydraulic fluid. The piston rod defines a distal end which, in typical bicycle frame construction, is pivotally connected to the seat stay members, with the body portion being pivotally connected to a linkage member of the rear suspension system. This type of shock absorber further includes a spring member which extends between the body portion and the seat stay members, with the piston rod extending axially through the spring member.

The other type of shock absorber often incorporated into rear suspension system of the bicycle frame comprises an upper retaining plate which is rigidly attached to a linkage member of the rear suspension system, and a lower retaining plate which is rigidly attached to the seat stay members of the bicycle frame. Firmly seated between the upper and lower retaining plates is a dampening member which is typically fabricated from an elastomeric material and defines a central aperture extending longitudinally therethrough. The shock absorber further comprises a limiting cable which extends through the central aperture of the dampening member and defines opposed ends which are attached to respective ones of the upper and lower retaining plates. The dampening member is usually compressed between the upper and lower retaining plates to maintain it in position and provide a pre-load thereto, though the same is sometimes mechanically fastened to the upper and lower retaining plates.

It has been found that the elastomeric shock absorber is preferable to the hydraulic fluid shock absorber due to the enhanced dampening characteristics provided thereby and the reduced costs associated therewith. However, such elastomeric shock absorbers themselves possess certain deficiencies which detract from their overall utility. In particular, after the rear wheel of the bicycle encounters a bump or other obstruction which actuates the rear suspension system in a manner facilitating the compression of the elastomeric shock absorber, it has been found that such shock absorber has a tendency to rebound from its compressed to its uncompressed state too rapidly. This rapid rebound causes the rider to feel a jolt, thus adversely affecting the performance characteristics of the bicycle. The present invention is adapted to overcome this deficiency by providing a position sensitive friction damper which is disposed within an elastomeric shock absorber and provides dampening during the rebound thereof from the compressed to the uncompressed states, thus alleviating the undesirable performance characteristics of the rear suspension system attributable to the undamped rebound of the shock absorber.

SUMMARY OF THE INVENTION

In accordance with the present invention, there is provided a bicycle shock absorber which is movable between compressed and uncompressed states, and comprises an elongate, resilient body defining top and bottom ends and a bore extending longitudinally therethrough. The body is preferably fabricated from an elastomer and has a generally cylindrical configuration, with the bore extending axially therethrough. In the preferred embodiment, the body comprises separate upper and lower sections.

The shock absorber constructed in accordance with the present invention further comprises a position sensitive friction damper which is disposed within the body. The friction damper itself comprises an upper support member which is disposed within the top end of the body, and a lower support member which is disposed within the bottom end of the body. Disposed within the bore and attached to the upper support member is an elongate guide member which defines a slot extending longitudinally therewithin. Additionally, disposed within the slot is a dampening member which is slidably movable therewithin. The slot is itself sized relative to the dampening member so as to provide frictional resistance to the movement thereof. Also disposed within the bore is an elongate connecting rod which has a first end attached to the dampening member and a second end pivotally connected to the lower support member. The movement of the shock absorber between the compressed and uncompressed states facilitates the movement of the dampening member within the slot.

The slot of the guide member defines upper and lower end portions of substantially equal width and a central portion having a width which is less than the widths of the upper and lower end portions. In this respect, the reduced width central portion of the slot provides the primary frictional resistance to the dampening member when the same moves therethrough.

In the preferred embodiment, the guide member is itself pivotally connected to the upper support member. In this respect, the shock absorber further comprises a first pivot member which is attached to the guide member for facilitating the pivotal connection thereof to the upper support member. In addition to the first pivot member, the shock absorber includes a second, identically configured pivot member which is attached to the second end of the connecting rod for facilitating the pivotal connection thereof to the lower support member. The first end of the connecting rod is threadably attached to the dampening member, with the second end thereof being threadably attached to the second pivot member. Additionally, the guide member is preferably attached to the first pivot member via a link member which is itself threadably attached to the guide member and the first pivot member.

The upper and lower support members of the shock absorber each preferably define recesses which are sized and configured to slidably receive respective ones of the first and second pivot members. Similarly, the top and bottom ends of the body of the shock absorber each preferably define recesses which are sized and configured to accommodate respective ones of the upper and lower support members.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figures 1, 2, 3:
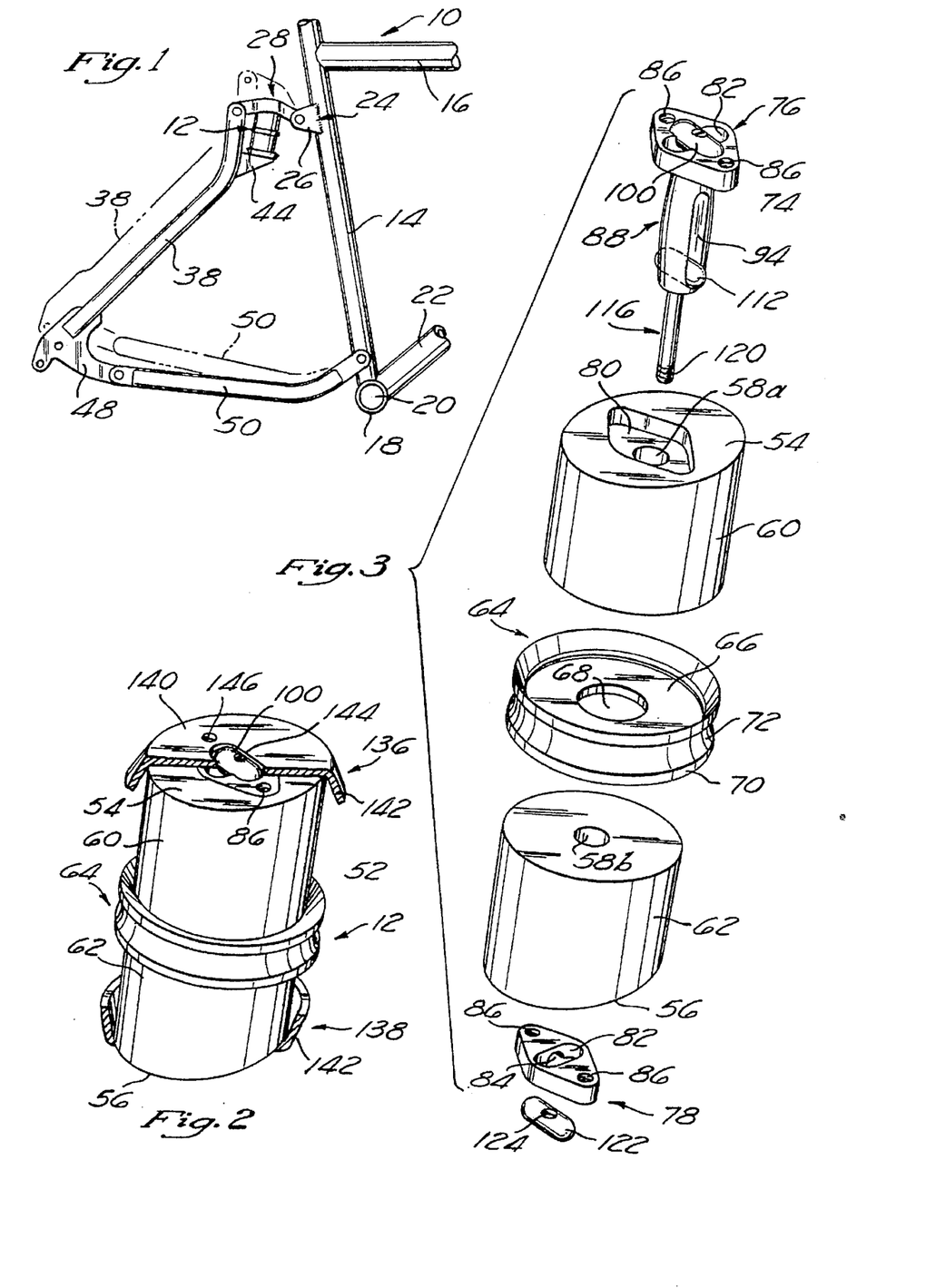
FIG. 1 is a side-elevational view of a bicycle rear suspension system incorporating the shock absorber constructed in accordance with the present invention, illustrating the movement of the suspension system when the shock absorber is moved between its compressed and uncompressed states.
FIG. 2 is a perspective view of the shock absorber of the present invention.
FIG. 3 is an exploded view of the shock absorber of the present invention.

Referring now to the drawings wherein the showings are for purposes of illustrating a preferred embodiment of the present invention, and not for purposes of limiting the same, FIG. 1 is a side-elevational view of an exemplary rear suspension system of a bicycle frame 10 in which the shock absorber 12 constructed in accordance with the present invention may be utilized. The bicycle frame 10 incorporating the rear suspension system comprises a seat tube 14 which is disposed toward the rear of the bicycle and a head tube (not shown) which is disposed at the front end of the bicycle. Rigidly attached to and extending between the head tube and the seat tube 14 is an elongate crossbar or top tube 16. Additionally, rigidly attached to the bottom end of the seat tube 14 is an axle receiving bracket 18 having a bore 20 extending axially therethrough. The axle receiving bracket 18 has a generally cylindrical configuration and is attached to the lower end of the seat tube 14 via a brazed or welded connection. The bore 20 of the axle receiving bracket 18 is sized and configured to receive the bottom bracket axle of the bicycle. Rigidly attached to and extending between the head tube and the axle receiving bracket 18 is an elongate down tube 22. Typically the head tube, seat tube 14, top tube 16, axle receiving bracket 18 and down tube 22 each have generally cylindrical configurations and are secured to one another via welded or brazed connections.

Figure 5:
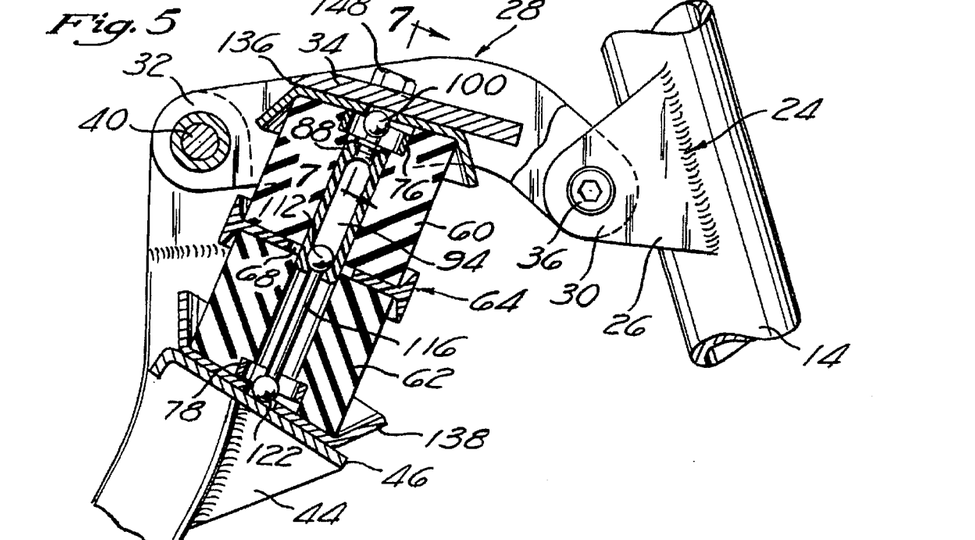
FIG. 5 is a partial cross-sectional view illustrating the present shock absorber in its uncompressed state.
Figure 6:
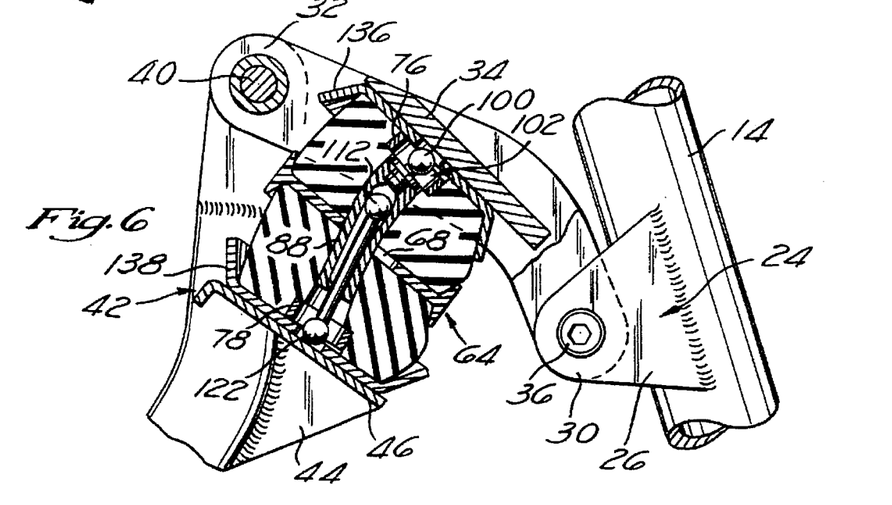
FIG. 6 is a partial cross-sectional view illustrating the present shock absorber in its compressed state.

Referring now to FIGS. 1, 5 and 6, the bicycle frame 10 further comprises a link bracket 24 which is attached to the back of the seat tube 14 and defines a pair of triangularly configured flange portions 26 extending in opposed, spaced relation. Extending laterally through the flange portions 26 is a pair of coaxially aligned apertures. The link bracket 24, and in particular the flange portions 26 thereof, are preferably attached to the seat tube 14 via a welding or brazing process.

Pivotally connected to the link bracket 24 is an upper link 28. The upper link 28 preferably has a generally H-shaped configuration which defines a front pair of mounting ears 30, a back pair of mounting ears 32, and a generally planar central base portion 34. Extending laterally through each pair of mounting ears 30, 32 is a pair of coaxially aligned apertures. The upper link 28 is pivotally connected to the link bracket 24 by initially inserting the front pair of mounting ears 30 between the flange portions 26 of the link bracket 24. In this respect, the distance separating the flange portions 26 from each other is adapted to slidably accommodate the front pair of mounting ears 30 of the upper link 28. When the front pair of mounting ears 30 are properly positioned between the flange portions 26, the apertures disposed within the mounting ears 30 and flange portions 26 will be coaxially aligned with each other. Thereafter, a fastener 36 is inserted into the coaxially aligned apertures, thus pivotally connecting the upper link 28 to the link bracket 24.

Figures 4, 8:
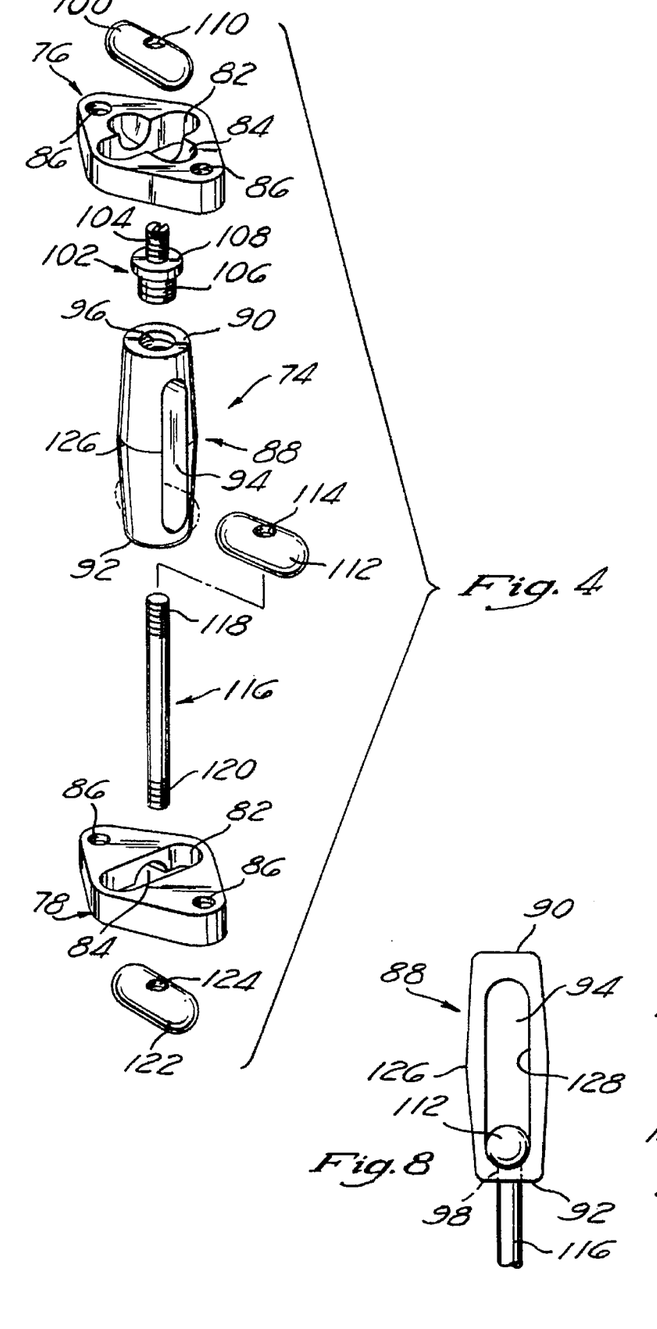
FIG. 4 is an exploded view of the position sensitive friction damper incorporated into the shock absorber of the present invention.
FIG. 8 is a side-elevational view of the guide member and dampening member of the friction damper, illustrating the guide member in an unflexed condition.

In addition to the aforementioned structural components, the bicycle frame 10 includes a pair of seat stay members 38, the upper ends of which are pivotally connected to the back pair of mounting ears 32 of the upper link 28. The pivotal connection of the seat stay members 38 to the upper link 28 is facilitated by the extension of a fastener 40 through coaxially aligned apertures extending laterally through the back pair of mounting ears 32 and upper ends of the seat stay members 38. As seen in FIG. 1, the upper portions of the seat stay members 38 are arcuately contoured, and bowed inwardly toward the seat tube 14 when the seat stay members 38 are pivotally connected to the upper link 28. Rigidly attached to and extending between the arcuately contoured portions of the seat stay members 38 is a shock support 42 which is also directed inwardly toward the seat tube 14. As best seen in FIGS. 1, 4 and 6, the shock support 42 defines a pair of triangularly configured leg portions 44 which are rigidly attached to respective ones of the seat stay members 38 via a welding or brazing process, and a generally planar middle portion 46 extending between the leg portions 44.

As further seen in FIG. 1, rigidly attached to the lower ends of respective ones of the seat stay members 38 is a pair of rear wheel axle receiving members 48, one of which is adapted to accommodate a rear derailleur. The rear wheel axle receiving members 48 are adapted to support the rear wheel axle of the rear wheel therebetween. In addition to the seat stay members 38, the bicycle frame 10 includes a pair of chain stay members 50, the front ends of which are pivotally connected to the seat tube 14. The back ends of the chain stay members 50 are themselves pivotally connected to respective ones of the rear wheel axle receiving members 48. Typically, such pivotal connection is facilitated by the receipt of the frontal portions of the rear wheel axle receiving members 48 into respective ones of a pair of clevis members attached to the back ends of the chain stay members 50, and subsequently extending fasteners through coaxially aligned apertures disposed within the clevis members and frontal portions of the rear wheel axle receiving members 48.

As will be explained in more detail below, the shock absorber 12 constructed in accordance with the present invention is extended between the central base portion 34 of the upper link 28 and middle portion 46 of the shock support 42 attached to the seat stay members 38. As will be recognized, the upper link 28, seat stay members 38, chain stay members 50 and shock absorber 12 constitute the primary components of the rear suspension system of the bicycle frame 10. The functionality of the shock absorber 12 within the rear suspension system will also be described in more detail below.

Referring now to FIGS. 2, 3, 5 and 6, the shock absorber 12 constructed in accordance with the present invention is movable between a normal, uncompressed state (shown in FIG. 5) and a compressed state (shown in FIG. 6). In the preferred embodiment, the shock absorber 12 comprises an elongate, resilient body 52 which defines a top end 54, a bottom end 56 and a bore extending longitudinally therethrough. The body 52 itself preferably comprises separate upper and lower sections 60, 62, with the upper section 60 defining the top end 54 and a bore segment 58a, and the lower section 62 defining the bottom end 56 and a bore segment 58b. The body 52, and in particular the upper and lower sections 60, 62 thereof, each have generally cylindrical configurations, with the respective bore segments 58a, 58b extending axially therethrough. Additionally, the upper and lower sections 60, 62 of the body 52 are each preferably fabricated from an elastomer, and in particular A60 polyurethane. However, it will be recognized that other materials of like resiliency may be utilized as an alternative.

In addition to the upper and lower sections 60, 62, the body 52 of the shock absorber 12 includes a central hub member 64 which is preferably fabricated from a rigid plastic material. As best seen in FIG. 3, the hub member 64 defines a circularly configured planar portion 66 including a central aperture 68 and a perpendicularly extending flange 70 formed about the peripheral edge thereof. The outer surface of the flange 70 itself defines a continuous, arcuately contoured channel 72. The diameter of the central aperture 68 substantially exceeds the diameter of the identically sized bore segments 58a, 58b. When the shock absorber 12 is fully assembled, the end of the upper section 60 opposite the top end 54 is abutted against one side of the planar portion 66, with the end of the lower section 62 opposite the bottom end 56 being abutted against the other side of the planar portion 66. When the upper and lower sections 60, 62 are abutted against respective ones of the opposed sides of the planar portion 66, the bore segments 58a, 58b are coaxially aligned with the central aperture 68. When the hub member 64 is placed between the upper and lower sections 60, 62 in the aforementioned manner, they as well as the bore segments 58a, 58b are maintained in coaxial alignment with each other by the perpendicularly extending flange 70 which prevents lateral movement of the upper and lower sections 60, 62. The body 52 of the shock absorber 12 is formed by the upper and lower sections 60, 62 and hub member 64, with the bore of the body 52 being defined by the bore segments 58a, 58b and central aperture 68. Though the body 52 is preferably fabricated from the separate upper and lower sections 60, 62 and hub member 64, it will be recognized that the same may alternatively be formed from a single piece of an elastomeric material.

As best seen in FIGS. 3 and 5, the opposed ends of the upper section 60 of the body 52 do not extend in co-planar relation to each other. Rather, the end of the upper section 60 defining the top end 54 is angularly offset relative to the opposite end thereof which is normally abutted against one side of the planar portion 66 of the hub member 64. Similarly, the end of the lower section 62 defining the bottom end 56 is angularly offset relative to its opposite end which is itself normally abutted against one side of the planar portion 66 of the hub member 64. The purpose for angularly offsetting the top and bottom ends 54, 56 of the body 52 will be discussed in more detail below.

Referring now to FIGS. 3, 4, 8 and 9, disposed within the body 52 of the shock absorber 12 is a position sensitive friction damper assembly 74. The damper assembly 74 comprises a pair of identically configured, diamond-shaped upper and lower support members 76, 78 which are received into complimentary recesses 80 formed in respective ones of the top and bottom ends 54, 56 of the body 52. The upper and lower support members 76, 78 each define a lateral notch 82 which extends completely therethrough and a longitudinal notch 84 which extends partially therethrough. Disposed adjacent the opposed ends of the longitudinal notch 84 are a pair of internally threaded apertures 86. The lateral and longitudinal notches 82, 84 are arranged in a cross-shaped pattern and extend in perpendicular relation to each other.

In addition to the upper and lower support members 76, 78, the damper assembly 74 comprises an elongate guide member 88 which resides in the bore segments 58a, 58b and central aperture 68 of the body 52. The guide member 88, which is preferably fabricated from DELRIN®, defines an upper end 90, a lower end 92, and a slot 94 extending longitudinally therewithin. Disposed within the upper end 90 is an internally threaded aperture 96 which communicates with the slot 94, while disposed within the lower end 92 is a non-threaded aperture 98 which likewise communicates with the slot 94.

In the preferred embodiment, the upper end 90 of the guide member 88 is pivotally connected to the upper support member 76. Such pivotal connection is facilitated by a generally bean-shaped first pivot member 100 which slidably resides within the longitudinal notch 84 of the upper support member 76. As best seen in FIGS. 3 and 4, the longitudinal notch 84 has a configuration which is complimentary to that of the first pivot member 100. The upper end 90 of the guide member 88 is attached to the first pivot member 100 via a link member 102 which includes externally threaded upper and lower portions 104, 106 separated by a radially extending flange portion 108. The upper portion 104 has a diameter which is substantially less than that of the lower portion 106. The lower portion 106 is threadably received into the aperture 96 which is complimentary thereto, with the upper portion 104 being threadably received into a complimentary, internally threaded aperture 110 extending laterally through the first pivot member 100.

Importantly, when the guide member 88 is pivotally connected to the upper support member 76 via the first pivot member 100 and link member 102, the guide member is free to pivot about the axis defined by the longitudinal slot 84 in which the first pivot member 100 resides. In constructing the damper assembly 74, the link member 102 and first pivot member 100 are attached to the guide member 88 in the aforementioned manner prior to the receipt of the first pivot member 100 into the longitudinal notch 84. In this respect, subsequent to the attachment of the link member 102 and first pivot member 100 to the guide member 88, the first pivot member 100 is extended through the lateral notch 82 of the upper support member 76, with the same subsequently being rotated approximately 90 degrees and pulled back into the longitudinal notch 84 to be properly seated therewithin.

The friction damper assembly 74 further comprises a dampening member 112 which is disposed within the slot 94 of the guide member 88 and slidably movable therewithin. The dampening member 112 is identically configured to the first pivot member 100, and includes an internally threaded aperture 114 extending laterally therethrough. Attached to the dampening member 112 is an elongate connecting rod 116 having opposed externally threaded first and second ends 118, 120. The attachment of the connecting rod 116 to the dampening member 112 is facilitated by the threadable receipt of the first end 18 into the complimentary aperture 114. When attached to the dampening member 112, the connecting rod 16 extends through the non-threaded aperture 98 disposed within the lower end 92 of the guide member 88.

In the preferred embodiment, the connecting rod 116 is itself pivotally connected to the lower support member 78. Such pivotal connection is facilitated by a second pivot member 122 which is attached to the second end 120 of the connecting rod 116. The second pivot member 122 is configured identically to the first pivot member 100, and includes an internally threaded aperture 124 extending laterally therethrough. The attachment of the second pivot member 122 to the connecting rod 116 is accomplished by the threadable receipt of the second end 120 thereof into the complimentary aperture 124. The pivotal engagement of the second pivot member 122 to the lower support member 78 is accomplished in the same manner as previously described in relation to the engagement of the first pivot member 100 to the upper support member 76. In this respect, subsequent to the attachment of the second pivot member 122 to the connecting rod 116, the same is extended through the lateral notch 82 of the lower support member 78 and subsequently rotated approximately 90 degrees so as to allow the same to be pulled into the complimentary longitudinal notch 84 of the lower support member 78. As will be recognized, once the second pivot member 122 has been properly nested within the lower support member 78, the connecting rod 116 may be pivoted about the axis defined by the longitudinal notch 84 of the lower support member 78.

Figure 9:
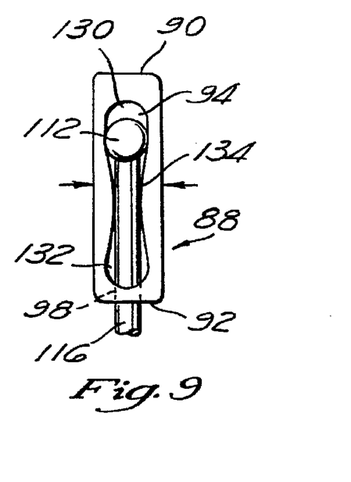
FIG. 9 is a side-elevational view of the guide member and dampening member of the friction damper, illustrating the guide member in a flexed condition.

As seen in FIG. 5, when the friction damper assembly 74 is properly integrated into the body 52 (which comprises the upper and lower sections 60, 62 and hub member 64), the guide member 88 and connecting rod 116 reside within the bore of the body 52 defined by the bore segments 58a, 58b and central aperture 68 of the hub member 64. Referring now to FIGS. 8 and 9, the guide member 88 of the friction damper assembly 74 is fabricated in a manner wherein a central region 126 thereof is of increased thickness and the opposed, longitudinal side walls 128 of the slot 94 extend in generally parallel relation to each other. As such, the outer surface of the guide member 88 as initially fabricated is not cylindrically configured, but rather tapers gradually outwardly from the upper and lower ends 90, 92, with the guide member 88 achieving its maximum diameter at the central region 126.

In the preferred embodiment, the diameter of each of the bore segments 58a, 58b is slightly less than the diameter of the upper and lower ends 90, 92 of the guide member 88. As such, when the guide member 88 is forced into the bore segments 58a, 58b of the body 52, the outer surface of the guide member 88, and in particular the central region 126 thereof, is compressed inwardly by the upper and lower sections 60, 62 in the manner shown in FIG. 9. Such compression flexes the central region 126 inwardly which causes the outer surface of the guide member 88 to assume a generally cylindrical configuration. As further seen in FIG. 9, such flexion also causes the slot 94, and in particular the longitudinal side walls 128 thereof, to assume an hourglass-like configuration. In this respect, when the longitudinal side walls 128 are collapsed, the slot 94 defines upper and lower end portions 130, 132 of substantially equal width, and a central portion 134 having a width which is substantially less than the width of the upper and lower end portions 130, 132. The width of the upper and lower end portions 130, 132 is approximately equal to, but slightly less than, the width (i.e., diameter) of the dampening member 112. The functionality of the friction damper assembly 74 attributable to the deformation of the slot 94 as previously described will be discussed below.

In addition to the aforementioned components, the shock absorber 12 constructed in accordance with the present invention further comprises identically configured upper and lower retaining plates 136, 138. The upper and lower retaining plates 136, 138 each comprise a generally circular central portion 140 and a peripheral flange portion 142 extending angularly outward from the central portion 140, thus giving each of the upper and lower retaining plates 136, 138 a generally pan-like configuration. As best seen in FIGS. 2, 5, and 6, the surface of the central portion 140 of the upper retaining plate 136 which is circumvented by the flange portion 142 is abutted against the top end 54 of the body 52. Similarly, the surface of the central portion 140 of the lower retaining plate 138 which is circumvented by the flange portion 142 is abutted against the bottom end 56 of the body 52.

As best seen in FIG. 2, the central portion 140 of each of the upper and lower retaining plates 136, 138 is provided with a central notch 144 and a pair of apertures 146 disposed adjacent the opposed ends of the central notch 144. The central notch 144 has a profile which is identical to that of the longitudinal notches 84 of the upper and lower support members 76, 78, with the apertures 146 being approximately the same diameter as the apertures 86 disposed within the upper and lower support members 76, 78. The central notches 144 and apertures 146 are oriented within the central portions 140 of the upper and lower retaining plates 136, 138 such that when they are abutted against respective ones of the top and bottom ends 54, 56, the longitudinal notches 84 of the upper and lower support members 76, 78 are aligned with respective ones of the central notches 144, with the apertures 86 of the upper and lower support members 76, 78 being coaxially aligned with respective pairs of the apertures 146.

Figure 7:
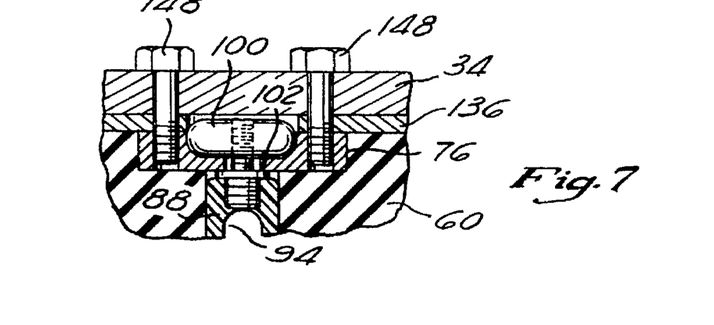
FIG. 7 is a partial cross-sectional view taken along line 7—7 of FIG. 5.

Referring now to FIGS. 5–7, the mounting of the shock absorber 12 to the bicycle frame 10 is facilitated by the attachment of the upper support member 76 of the friction damper assembly 74 to the central base portion 34 of the upper link 28, and the attachment of the lower support member 78 to the middle portion 46 of the shock support 42. Such attachment is facilitated by the extension of a pair of fasteners such as bolts 148 through the central base portion 34, through the apertures 146 of the upper retaining plate 136, and into the threaded apertures 86 of the upper support member 76. Similarly, a pair of bolts are extended through the middle portion 46 of the shock support 42, through the apertures 146 of the lower retaining plate 138, and into the threaded apertures 86 of the lower support member 78. As will be recognized, when the shock absorber 12 is mounted to the bicycle frame 10, the surface of the central portion 134 of the upper retaining plate 136 not circumvented by the flange portion 142 is abutted against the central base portion 34, with the surface of the central portion 140 of the lower retaining plate 138 not circumvented by the flange portion 142 being abutted against the middle portion 46 of the shock support 42.

In the preferred embodiment, when the shock absorber 12 is in its uncompressed state (shown in FIG. 5), the body 52 thereof is preferably slightly pre-loaded between the upper and lower retaining plates 136, 138. Such pre-loading is typically achieved by sizing the upper and lower sections 60, 62 such that when the upper and lower retaining plates 136, 138 are positioned on the top and bottom ends 54, 56 of the body 52, the distance separating the outer surfaces of the central portions 140 thereof from each other slightly exceeds the distance separating the lower surface of the central base portion 34 from the upper surface of the middle portion 46. As will be recognized, such relative sizing necessitates that the body 52, and in particular the upper and lower sections 60, 62 thereof, be slightly compressed to enable the upper and lower retaining plates 136, 138 to be inserted and properly oriented between the central base portion 34 and middle portion 46. However, the body 52 need not have a pre-load applied thereto.

As previously explained, the top end 54 of the body 52 defined by the upper section 60, and the bottom end 56 of the body 52 defined by the lower section 62, are angularly offset relative to the ends of the upper and lower sections 60, 62 which are abutted against the planar portion 66 of the hub member 64. Since, when the shock absorber 12 is in its normal, uncompressed state, the lower surface of the central base portion 34 does not extend in co-planar relation to the upper surface of the middle portion 46, the angling of the top and bottom ends 54, 56 allows the same to be firmly abutted against the central portions 140 of respective ones of the upper and lower retaining plates 136, 138 when the shock absorber 12 is inserted between the central base portion 34 and middle portion 46.

As seen in FIG. 5, when the shock absorber 12 is in its normal, uncompressed state, the dampening member 112 is firmly seated against the lower end of the slot 94. In this respect, the friction damper assembly 74 acts as a limiting mechanism which prevents the shock absorber 12, and in particular the body 52 thereof, from extending beyond its limit. In addition to the dampening member 112 being seated against the lower end of the slot 94, the top and bottom ends 54, 56 of the body 52 are in contact with only the central portions 140 of the upper and lower retaining plates 136, 138, with gaps existing between the outer surfaces of the upper and lower sections 60, 62 and the flange portions 142 of the upper and lower retaining plates 136, 138. Though not apparent from FIG. 5, the slot 94 of the guide member 88 has the configuration shown in FIG. 9, due to the guide member 88 having been inserted into the bore segments 58a, 58b.

When a shock force is applied to the rear wheel of the bicycle incorporating the rear suspension system shown in FIG. 1, the rear wheel axle receiving members 48 are moved upwardly, which results in the upward planar motion of the seat stay members 38. The upward planar motion of the seat stay members 38 in turn causes the upper link 28 to pivot upwardly about the center point of the fastener 36. The upward pivotal motion of the upper link 28 concurrently with the planar motion of the seat stay members 38 facilitates the movement of the shock absorber 12 from the uncompressed state (shown in FIG. 5) to the compressed state (shown in FIG. 6). In this respect, when the shock absorber 12 compresses, the "knee action" of the upper link 28 and seat stay members 38 compresses the body 52, with the central base portion 34 and middle portion 46 moving about a common pivot in a scissor-like motion.

As further seen in FIG. 6, the compression of the body 52, and in particular the upper and lower section 60, 62 thereof, causes the dampening member 112 to be forced toward the top end of the slot 94 (i.e., toward the upper support member 76). As will be recognized, for the dampening member 112 to travel from the position shown in FIG. 5 to that shown in FIG. 6, the same must pass through the reduced width central portion 134 of the slot 94. Importantly, the central portion 134 provides a significant amount of frictional resistance to the dampening member 112 as the same is forced therethrough. In this respect, the portions of the longitudinal side walls 128 of the slot 94 defining the central portion 134 must be forced outwardly, with such outward movement being resisted by the upper and lower sections 60, 62. As such, the upper and lower sections 60, 62 must be slightly deformed for passage of the dampening member 112 through the central portion 134 to occur. This frictional resistance has the effect of slowing the rate at which the shock absorber 12 moves from the uncompressed to the compressed states. As the shock absorber 12 is compressed, the movement of the central base portion 34 of the upper link 28 and middle portion 46 of the shock support 42 relative to each other is accommodated by the pivotal connections of the guide member 88 and connecting rod 116 to the upper and lower support members 76, 78 via the first and second pivot members 100, 122. When the shock absorber 12 is compressed, the upper and lower sections 60, 62 thereof are maintained between the upper and lower retaining plates 136, 138 by the flange portions 142 against which the top and bottom ends 54, 56 are abutted when the shock absorber 12 is compressed.

Due to the resilience of the upper and lower sections 60, 62 of the body 52, the shock absorber 12, after moving to its compressed state, will immediately return to its uncompressed state shown in FIG. 5. In this respect, when the upper and lower sections 60, 62 resiliently return to their uncompressed conditions, the dampening member 112 will be caused to travel back toward the lower end of the slot 94 (i.e., toward the lower support member 78). When traveling back toward the lower end of the slot 94, the dampening member 112 must once again pass through the reduced width central portion 134 of the slot 94 which, as previously explained, provides significant frictional resistance thereto. Such frictional resistance greatly slows the rate at which the shock absorber 12 returns from its compressed state shown in FIG. 6 to its uncompressed state shown in FIG. 5. As such, the action of the friction damper assembly 74 prevents the body 52 of the shock absorber 12 from rapidly rebounding, thereby eliminating any jolt which is applied to the bicycle frame 10.

Additional modifications and improvements of the present invention may also be apparent to those skilled in the art. Thus, the particular combination of parts described and illustrated herein is intended to represent only certain embodiments of the present invention, and is not intended to serve as limitations of alternative devices within the spirit and scope of the invention.

What is claimed is:

1. A position sensitive friction damper for incorporation into a bicycle shock absorber, said friction damper comprising:

an upper support member;

a lower support member;

an elongate guide member attached to said upper support member and defining a slot extending longitudinally therewithin;

a dampening member disposed within said slot and slidably movable therewithin; and an elongate connecting rod having a first end attached to said dampening member and a second end pivotally connected to said lower support member;

wherein the insertion of the guide member into a shock absorber body causes the slot to be sized relative to the dampening member in a manner providing frictional resistance to the movement of the dampening member therewithin, the movement of the body between compressed and uncompressed states facilitating the movement of the dampening member within the slot.

2. The friction damper of claim 1 wherein said guide member is pivotally connected to said upper support member.

3. A bicycle shock absorber movable between compressed and uncompressed states, said shock absorber comprising:

an elongate, resilient body defining top and bottom ends and a bore extending longitudinally therethrough; and a position sensitive friction damper disposed within said body and comprising:

an upper support member disposed within the top end of the body;

a lower support member disposed within the bottom end of the body;

an elongate guide member disposed within said bore and attached to said upper support member, said guide member defining a slot extending longitudinally therewithin;

a dampening member disposed within said slot and slidably movable therewithin, said slot being sized relative to the dampening member so as to provide frictional resistance to the movement thereof; and an elongate connecting rod disposed within said bore and having a first end attached to said dampening member and a second end pivotally connected to said lower support member;

wherein the movement of the shock absorber between the compressed and uncompressed states facilitates the movement of the dampening member within the slot.

4. The shock absorber of claim 3 wherein said body is fabricated from an elastomer.

5. The shock absorber of claim 3 wherein said body has a generally cylindrical configuration with said bore extending axially therethrough.

6. The shock absorber of claim 3 wherein said body comprises separate upper and lower sections.

7. The shock absorber of claim 3 wherein said slot defines upper and lower end portions of substantially equal width, and a central portion having a width which is less than the width of the upper and lower end portions.

8. The shock absorber of claim 3 wherein said guide member is pivotally connected to said upper support member.

9. The shock absorber of claim 8 further comprising a first pivot member attached to the guide member for facilitating the pivotal connection thereof to the upper support member, and a second pivot member attached to the second end of the connecting rod for facilitating the pivotal connection thereof to the lower support member.

10. The shock absorber of claim 9 wherein the first end of the connecting rod is threadably attached to the dampening member, and the second end of the connecting rod is threadably attached to the second pivot member.

11. The shock absorber of claim 9 wherein said guide member is attached to said first pivot member via a link member which is threadably attached to said guide member and said first pivot member.

12. The shock absorber of claim 9 wherein said upper and lower support members each define recesses which are sized and configured to slidably receive respective ones of the first and second pivot members.

13. The shock absorber of claim 3 wherein the top and bottom ends of the body each define recesses which are sized and configured to accommodate respective ones of the upper and lower support members.

* * * * *